US009495451B2

(12) United States Patent
Harron

(10) Patent No.: US 9,495,451 B2
(45) Date of Patent: Nov. 15, 2016

(54) IDENTIFYING VIDEO CONTENT VIA FINGERPRINT MATCHING

(71) Applicant: Gracenote, Inc., Emeryville, CA (US)

(72) Inventor: Wilson Harron, Berkeley, CA (US)

(73) Assignee: Gracenote, Inc., Emeryville, CA (US)

( * ) Notice: Subject to any disclaimer, the term of this patent is extended or adjusted under 35 U.S.C. 154(b) by 107 days.

(21) Appl. No.: 13/735,426

(22) Filed: Jan. 7, 2013

(65) Prior Publication Data

US 2014/0195548 A1 Jul. 10, 2014

(51) Int. Cl.
*G06Q 30/02* (2012.01)
*G06F 17/30* (2006.01)

(52) U.S. Cl.
CPC ... *G06F 17/30799* (2013.01); *G06F 17/30864* (2013.01); *G06Q 30/02* (2013.01)

(58) Field of Classification Search
CPC .......... G06Q 30/02; G06F 17/30864
See application file for complete search history.

(56) References Cited

U.S. PATENT DOCUMENTS

| | | | |
|---|---|---|---|
| 8,150,096 B2 | 4/2012 | Alattar | |
| 8,458,482 B2* | 6/2013 | Conwell | 713/176 |
| 8,594,392 B2* | 11/2013 | Bilobrov | 382/124 |
| 9,081,778 B2* | 7/2015 | Garside | G06F 17/30023 |
| 9,323,840 B2 | 4/2016 | Harron et al. | |
| 2006/0155701 A1 | 7/2006 | Huang et al. | |
| 2009/0324199 A1 | 12/2009 | Haitsma et al. | |
| 2010/0007797 A1* | 1/2010 | Stojancic | G06F 17/30799 348/607 |
| 2010/0049711 A1* | 2/2010 | Singh et al. | 707/6 |
| 2011/0116719 A1 | 5/2011 | Bilobrov | |
| 2012/0143915 A1* | 6/2012 | Gupta | G06F 17/30799 707/780 |
| 2013/0054645 A1* | 2/2013 | Bhagavathy et al. | 707/780 |
| 2013/0064417 A1 | 3/2013 | Fernandes et al. | |
| 2013/0208942 A1* | 8/2013 | Davis | 382/100 |
| 2013/0297942 A1 | 11/2013 | Conwell | |
| 2013/0326573 A1* | 12/2013 | Sharon | H04H 60/59 725/115 |
| 2014/0193027 A1 | 7/2014 | Scherf et al. | |
| 2014/0236988 A1 | 8/2014 | Harron et al. | |

FOREIGN PATENT DOCUMENTS

WO WO-2015167901 A1 11/2015

OTHER PUBLICATIONS

U.S. Appl. No. 14/263,647, filed Apr. 28, 2014 2167, Video Fingerprinting.
"U.S. Appl. No. 14/263,647, Non Final Office Action mailed Mar. 18, 2015", 16 pgs.
"U.S. Appl. No. 14/263,647, Response filed Jun. 19, 2015 to Non Final Office Action mailed Mar. 18, 2015", 12 pgs.
"International Application Serial No. PCT/US2015/027117, International Search Report mailed Aug. 5, 2015", 2 pgs.

(Continued)

*Primary Examiner* — Rehana Perveen
*Assistant Examiner* — Raheem Hoffler
(74) *Attorney, Agent, or Firm* — Schwegman Lundberg & Woesner, P.A.

(57) ABSTRACT

Methods and systems to identify video content based on video fingerprint matching are described. In some example embodiments, the methods and systems generate a query fingerprint of a frame of video content captured at a client device, query a database of reference fingerprints, determine the query fingerprint of the frame of captured video content matches a reference fingerprint, and identify the video content based on the match of fingerprints.

20 Claims, 7 Drawing Sheets

(56) References Cited

OTHER PUBLICATIONS

"International Application Serial No. PCT/US2015/027117, Written Opinion mailed Aug. 5, 2015", 10 pgs.
"U.S. Appl. No. 14/263,647, Final Office Action mailed Oct. 22, 2015", 9 pgs.
"U.S. Appl. No. 14/263,647, Notice of Allowance mailed Jan. 20, 2016", 11 pgs.
"U.S. Appl. No. 14/263,647, Response filed Dec. 22, 2015 to Final Office Action mailed Oct. 22, 2015", 9 pgs.
"U.S. Appl. No. 15/136,412, Preliminary Amendment filed May 6, 2016", 7 pgs.
"Automated Content Recognition: Creating Content Aware Ecosystems", A White Paper by Civolution, (Sep. 2012), 16 pgs.
Li, Mu, "Video Fingerprinting: Algorithm Design and Performance Analysis", Information Processing and Algorithms Laboratory, Pennsylvania State University, (Oct. 19, 2012), 29 pgs.
Liu, Tzu-Jui, et al., "A Robust and Lightweight Feature System for Video Fingerprinting", 20th European Signal Processing Conference (EUSIPCO), (Aug. 27-31, 2012), 160-164.
Stojancic, Mihailo, "Audio-Video Content Fingerprinting for Smart TV and Synchronous Mobile Content Identification", Zeitera, LLC., (Jun. 28, 2011), 50 pgs.

\* cited by examiner

US 9,495,451 B2

IDENTIFYING VIDEO CONTENT VIA FINGERPRINT MATCHING

TECHNICAL FIELD

The subject matter disclosed herein generally relates to the processing of data. Specifically, the present disclosure addresses systems and methods to identify video content via fingerprint matching.

BACKGROUND

Typically, people watch video content, such as television shows, advertisements, movies, video clips, and so on, via devices that receive a transmission from a content source. For example, a broadcaster (e.g., HBO® or CNN®), a web server (e.g., YouTube®), a peer-to-peer source (e.g., another device), and so on, streams or otherwise transmits video content to various devices capable of presenting the video content, such as televisions and associated set-top boxes, computing and/or mobile devices and associated media players or browsers, and so on.

BRIEF DESCRIPTION OF THE DRAWINGS

Some embodiments are illustrated by way of example and not limitation in the figures of the accompanying drawings.

DETAILED DESCRIPTION

Overview

Example methods and systems for identifying video content via fingerprint matching are described. In some example embodiments, the methods and systems generate a query fingerprint of a frame of video content captured at a client device. For example, the methods and systems may select multiple patches of the video content and calculate a value for each of the selected multiple patches using an integral image technique or other similar technique. The systems and methods may query a database of known reference fingerprints using the generated query fingerprint, determine the query fingerprint of the frame of video content matches a known reference fingerprint, and identify the video content based on the match of fingerprints.

In some example embodiments, in response to the identification, the systems and methods may return an identifier for supplemental content associated with the identified video content to the client device. The client device may use a received identifier to access metadata, event-based content, and/or other supplemental information or content that is associated with video content and/or at a time or location (e.g., a frame or block of frames) within the video content, that is currently being presented via the client device.

In the following description, for purposes of explanation, numerous specific details are set forth to provide a thorough understanding of example embodiments. It will be evident to one skilled in the art, however, that the present subject matter may be practiced without these specific details.

Example Network Environment

Figure 1:
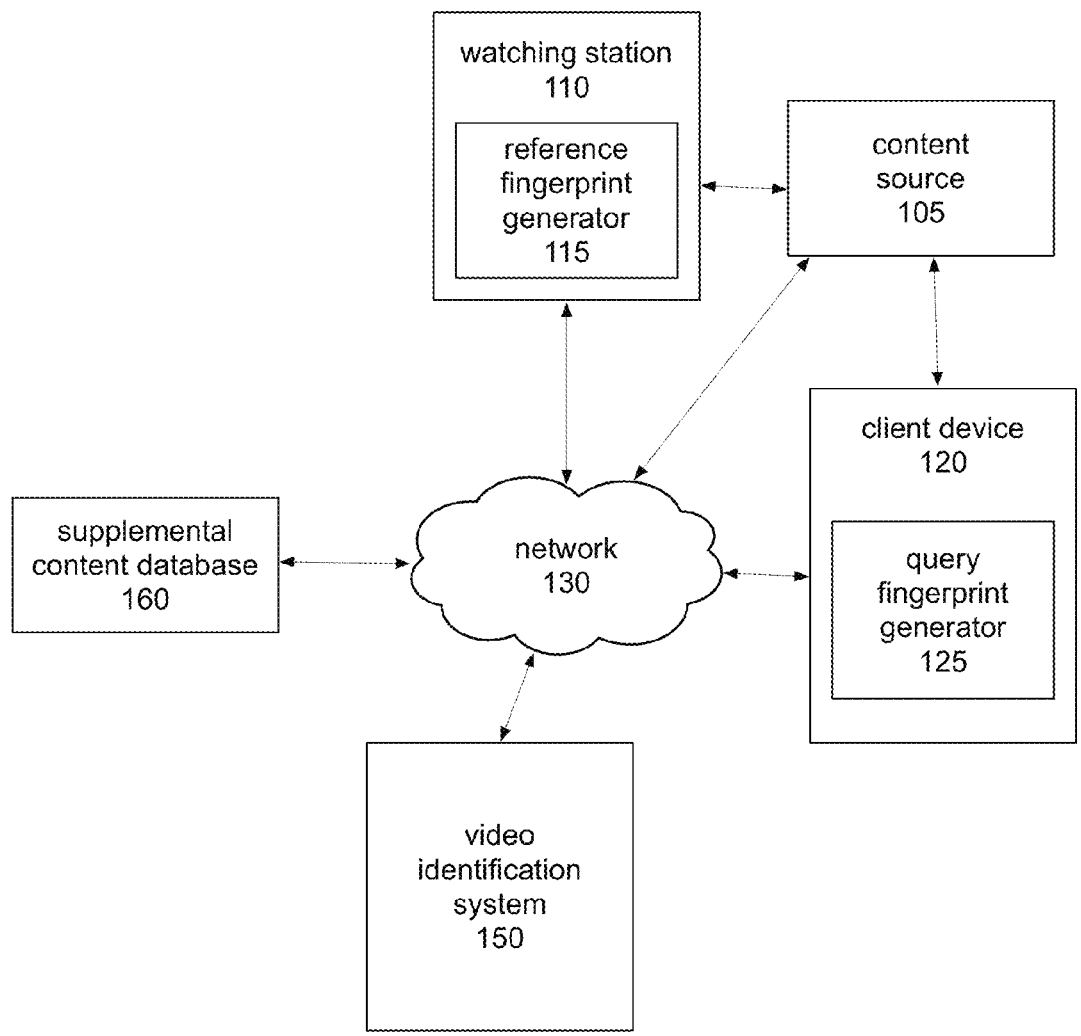
FIG. 1 is a network diagram illustrating a network environment suitable for identifying video content via fingerprint matching, according to some example embodiments.

FIG. 1 is a network diagram illustrating a network environment 100 suitable for identifying video content via fingerprint matching, according to some example embodiments.

The network environment 100 may include a watching station 110 that receives video and other multimedia content from a content source 105, such as a broadcaster, web server, and so on. For example, the content source 105 may be a broadcaster, such as television station or television network, which streams or transmits media over a television channel to the watching station 110, and/or a web service, such as a website, that streams or transmits media over a network 130 to the watching station, among other things. The watching station 110 includes a reference fingerprint generator 115 that generates reference fingerprints of video content received from the content source 105.

One or more client devices 120 may also receive the video and other multimedia content from the content source 105, such as via a broadcast channel and/or over the network 130. The client devices 120 may include televisions, set-top boxes, laptops and other personal computers, tablets and other mobile devices, gaming devices, and other devices capable of receiving and presenting a stream of video and/or other multimedia content.

In some example embodiments, the client device 120 may include a tuner configured to receive a stream of video content and play the stream of video content by processing the stream and outputting information (e.g., digital or analog) usable by a display of the client device 120 to present the video content to a user associated with the client device 120. The client device 120 may also include a display or other user interface configured to display the processed stream of video content. The display may be a flat-panel screen, a plasma screen, a light emitting diode (LED) screen, a cathode ray tube (CRT), a liquid crystal display (LCD), a projector, and so on.

The network 130 may be any network that enables communication between devices, such as a wired network, a wireless network (e.g., a mobile network), and so on. The network 130 may include one or more portions that constitute a private network (e.g., a cable television network or a satellite television network), a public network (e.g., over-the-air broadcast channels or the Internet), and so on.

In some example embodiments, a video identification system 150 communicates with the watching station 110 and the client device 120 over the network 130. The video identification system 150 may receive a query fingerprint generated by the query fingerprint generator 125 of the client device 120, such as a fingerprint of a frame or block of frames within the video content, and query an index of known reference fingerprints generated by the reference fingerprint generator 115 of the watching station 110, in order to identify the video content by matching the query fingerprint with one or more reference fingerprints.

Upon identifying the video content, the video identification system 150 may return an identifier for supplemental content (e.g., metadata, event-based information, and so on), such as content contained in a supplemental content database 160, associated with the video content to the client device 120. Using the identifier, the client device 120 may access the supplemental content from the database 160 and present the supplemental content along with playing video content, among other things. For example the client device 120 may access and present supplemental content from the database 160, such as listing or guide information for a broadcast channel, metadata associated with playing video content, information associated with playing video content, and so on.

Any of the machines, databases, or devices shown in FIG. 1 may be implemented in a general-purpose computer modified (e.g., configured or programmed) by software to be a special-purpose computer to perform the functions described herein for that machine. For example, a computer system able to implement any one or more of the methodologies described herein is discussed below with respect to FIG. 6. As used herein, a "database" is a data storage resource and may store data structured as a text file, a table, a spreadsheet, a relational database, a triple store, or any suitable combination thereof. Moreover, any two or more of the machines illustrated in FIG. 1 may be combined into a single machine, and the functions described herein for any single machine may be subdivided among multiple machines.

Furthermore, any of the modules, systems, and/or generators may be located at any of the machines, databases, or devices shown in the FIG. 1. For example, the video identification system 150 may include the query fingerprint generator 125, frames of video content from the client device 120, and generate the query fingerprints using the included query fingerprint generator 125, among other configurations.

Examples of Identifying Video Content

Figure 2:
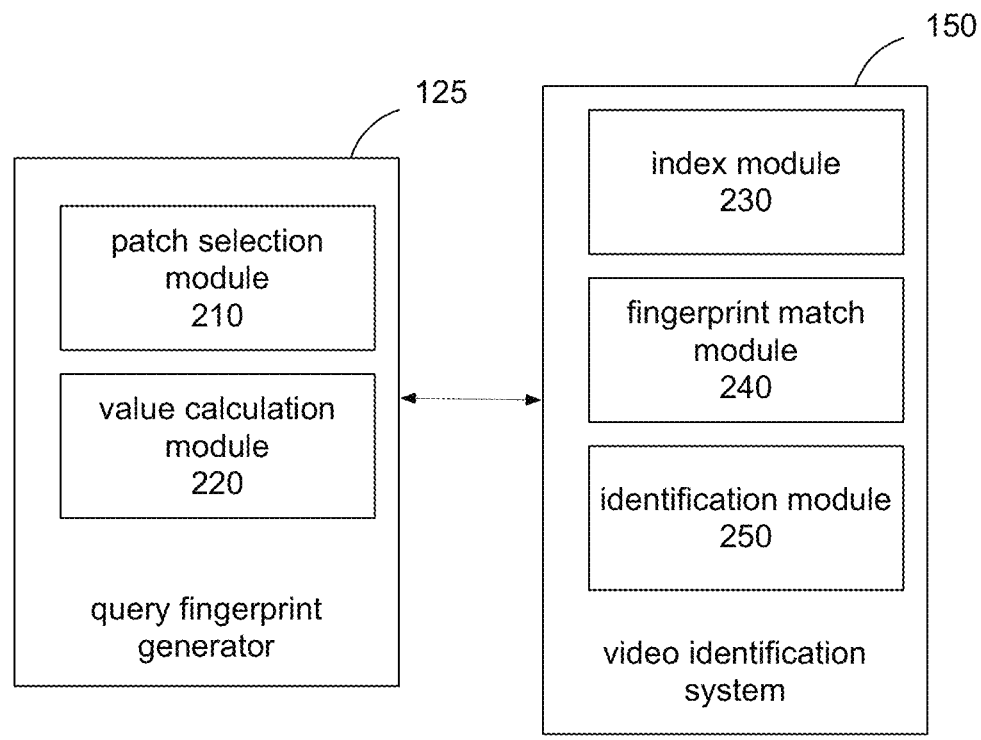
FIG. 2 is a block diagram illustrating components of a video identification system and a query fingerprint generator, according to some example embodiments.

As described herein, in some example embodiments, the systems and methods described herein utilize fingerprints of video content to identify the video content. FIG. 2 is a block diagram illustrating components of a video identification system 150 and a query fingerprint generator 125, according to some example embodiments.

The query fingerprint generator 125 of the client device 120 (or, the reference fingerprint generator 115 of the watching station 110) includes a patch selection module 210 and a value calculation module 220, all configured to communicate with each other (e.g., via a bus, shared memory, or a switch). The video identification system 150 includes an index module 230, a fingerprint match module 240, and an identification module 250, all configured to communicate with each other (e.g., via a bus, shared memory, or a switch).

One or more of the modules described herein may be implemented using hardware (e.g., a processor of a machine) or a combination of hardware and software. Moreover, any two or more of these modules may be combined into a single module, and the functions described herein for a single module may be subdivided among multiple modules.

In some example embodiments, the query fingerprint generator 125 is configured and/or programmed to generate a query fingerprint of one or more frames of video content captured at the client device 120. For example, the query fingerprint generator 125 may calculate values of patches, such as Haar-like features, regions, portions, and/or other aspects of one or more frames within the video content. For example, a patch may be a portion of a frame having various different geometries, a Haar-like feature, and so on. In some example embodiments, some or all captured patches may each have a different scale and be at a different location within a frame, among other things.

The query fingerprint generator 125 (and the reference fingerprint generator 115) generates and/or creates fingerprints for identifying video content from frames within the content. Typically, video content received by the client device 120 with be in different formats and sample rates, and the query fingerprint generator 125 creates, for some or all of the frames of the video content, a query fingerprint for each frame that is scale independent and robust to different compression artifacts, among other things. In some example embodiments, the query fingerprint generator 125 may combine the query fingerprints of each of the frames to generate a query fingerprint of a block of frames (e.g., multiple frames) of the video content.

The query fingerprint generator 125 may include a patch selection module 210 configured and/or programmed to select multiple patches of the video content, such as patches associated with a displayed region of a frame or frames within the video content.

The query fingerprint generator 125 may also include a value calculation module 220 configured and/programmed to calculate a value for each of the selected multiple patches using an integral image technique, such as a technique that calculates the values using a summed area table or other data structure that generates a sum of values in a rectangular area of a region.

For example, the patch selection module 210 may select patches, such as Haar-like features that are commonly used in object detection, of regions of a frame or frames. The value calculation module 220 may utilize the Haar-like features to generate and/or calculate a same value for objects in a frame, such as objects in a visual image of a frame), regardless of the relative size of the object. For example, the value calculation module 220 may generate values by approximating Gaussian filters and their derivatives using a box filter (e.g., an average of a region of the frame), wherein derivatives of the Gaussian filters are created by finding the differences in the box filters.

Figure 3A:
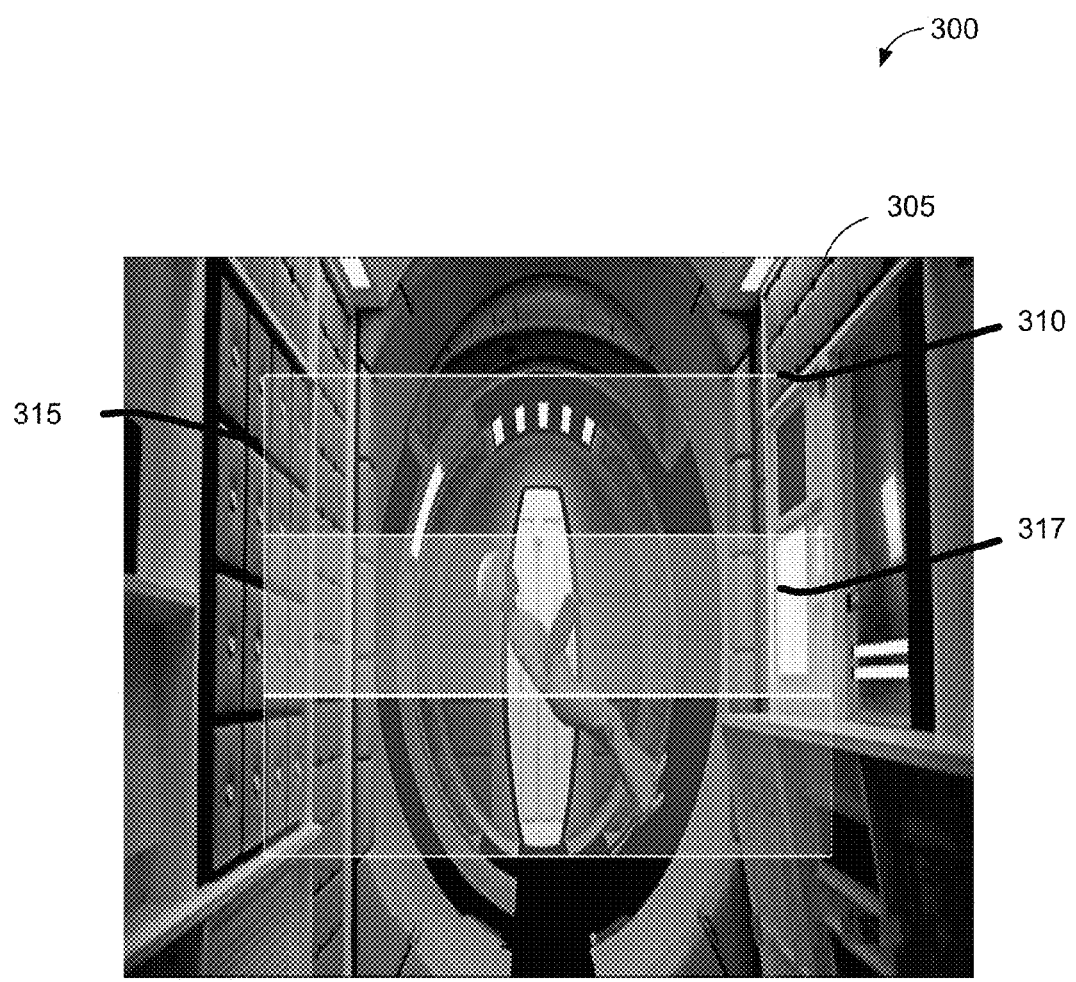
FIGS. 3A-3B are display diagrams illustrating patches applied to a frame of video content.
Figure 3B:
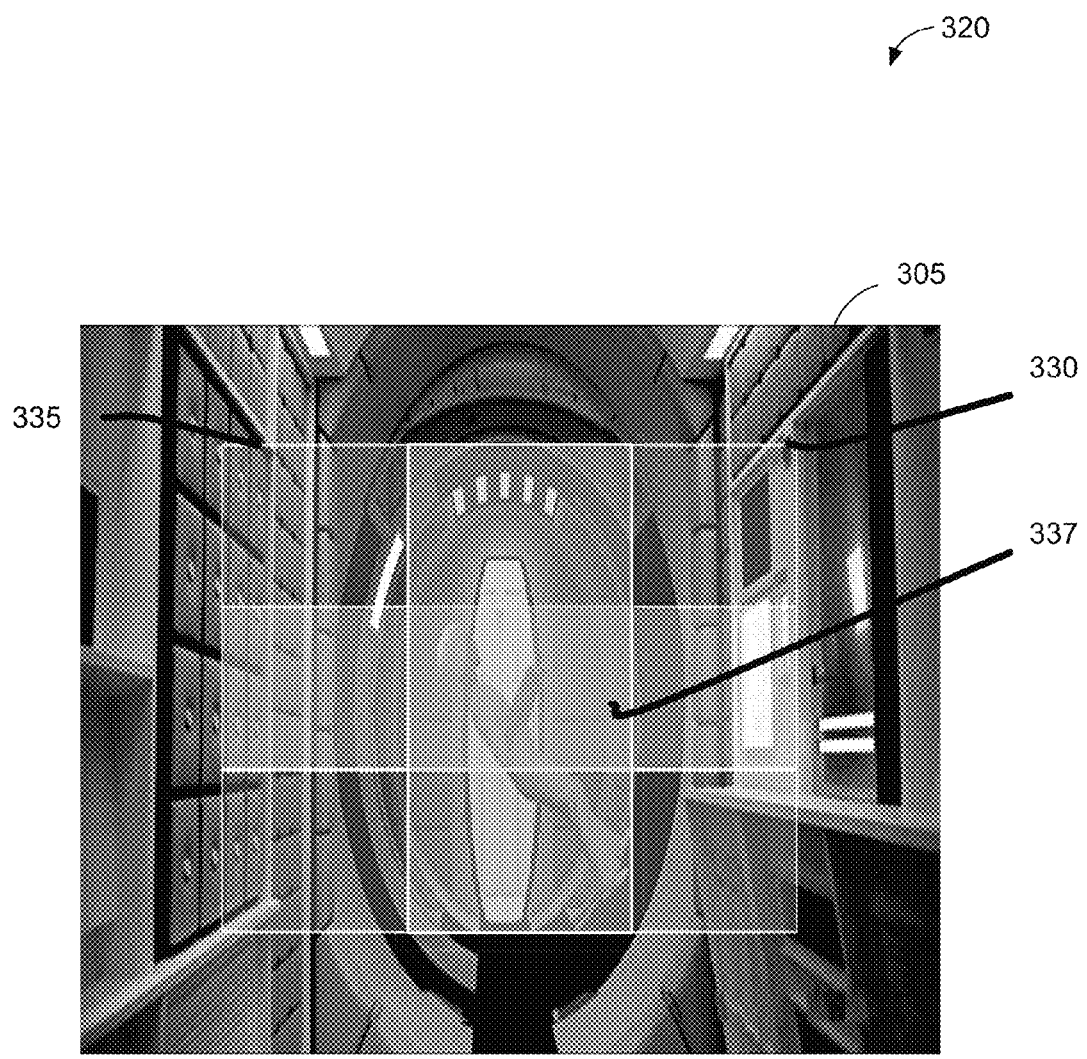

The query fingerprint generator 125, via the value calculation module 220, may generate a query fingerprint by calculating the values of Haar-like features, or patches, at different scales and in different locations of displayed regions of the frames of video content. FIG. 3A is a display diagram 300 illustrating a first patch 310 applied to a frame 305 of video content. The patch 310 includes a middle region 317 and outer regions 315. The value calculation module 220 may calculate a value of the patch 310 by subtracting the middle region 317 from the outer regions 315, in order to determine what region of the patch 310 has a higher amount of energy. FIG. 3B is a display diagram 320 illustrating a second, different, patch 330 applied to a frame 305 of video content. The patch 330 includes a middle region 337 and outer regions 335. The value calculation module 220 may calculate a value of the patch 330 by subtracting the middle region 337 from the outer regions 335, in order to determine what region of the patch 330 has a higher amount of energy.

In some example embodiments, the patch selection module 210 selects 32 patches, which include 8 patches for the first 8 regions of a frame and 24 other patches of the left-right and top-bottom features of each region of the frame that results when the frame is divided into a 4×3 grid of 12 regions. Of course, the patch selection module 210 may select a different number of patches or a different configuration of patches.

In some example embodiments, the value calculation module 220 calculates a query or reference fingerprint by utilizing integral image techniques. For example, the value calculation module 220 may calculate an integral image, which is a summed image where each pixel is a cumulation of values of the pixels above and to the left, as well as the current pixel. The integral image technique may enable an efficient creation of a fingerprint once an integral image is created, among other benefits. Further efficiencies may be realized by using Integrated Performance Primitive (IPP) libraries (created by Intel®), to create the integral image, and/or by skipping columns and/or rows while generating the integral image in order to process smaller amounts of data, among other things.

Using the integral images, the value calculation module 220 may then calculate values for multiple regions or patches of a frame, such as by using the following formula:

$$FP(i,j,w,h)=I_{int}(i,j)-I_{int}(i+w,j)-I_{int}(i,j+h)+I_{int}(i+w,j+h).$$

In this example, the value calculation module 220 calculates values for the patches or regions of a frame as 16-bit integers, because the range is [−255, 255], which is outside the range of an 8-bit integer. Additionally, the calculated patches or regions of a frame may be weighted by their size, and the calculated values may be floating point values. To capture this information, the values for the fingerprint are scaled to a full 16-bit range. However, in some example embodiments, the values may be quantized to 8-bits, reducing the storage space of a generated fingerprint (e.g., from 64 bytes to 32 bytes), among other things.

In some example embodiments, the query fingerprint generator 125 may verify whether one or more frames of video content includes pillar bars. Pillar bars are added to a frame of video content when the aspect ratio of a source device is different from an aspect ratio of a display device. For example, in broadcasting, pillars are commonly added when video content having 4:3 aspect ratio is displayed on a television having a 16:9 aspect ratio. In these scenarios, the query fingerprint generator 125 may verify whether frames include pillar bars, as included pillar bars may affect the identification of fingerprints, among other things.

In some examples, in order to identify pillar bars in a frame of video content, the query fingerprint generator 125 may perform a binary search of the calculated integral image to find edges of the image content. For example, the query fingerprint generator 125 may utilize a pillar bar algorithm in order to identify regions of actual video content within a frame, and not the pillar bars. The following is an example algorithm for finding a left pillar bar in a frame of video content:

```
function FindLeft(w, h)
    x ← w/3
    Δx ← w/3
    while Δx > 1 do
        Δx ← Δx/2
        fp ← FP_{LvR}(0,0,x,h)
        if |fp| < threshold then
            x ← x + Δx
        else
            x ← x − Δx
        end if
    end while
    return x
end function
```

For every iteration, the algorithm may calculate the Haar-like feature (Left vs. Right) from the left edge of the image to the value of x, and when the area is generally flat (e.g., the same image content from Left to Right), then x is moved further into the image; when there is a significant difference, x is moved further out of the image. As the algorithm runs, the amount that x is adjusted by (Δx) is halved, which allows the algorithm to run in log(n) time to find the pillar box (e.g., where n is ⅓ the width or height of the image).

Figure 4:
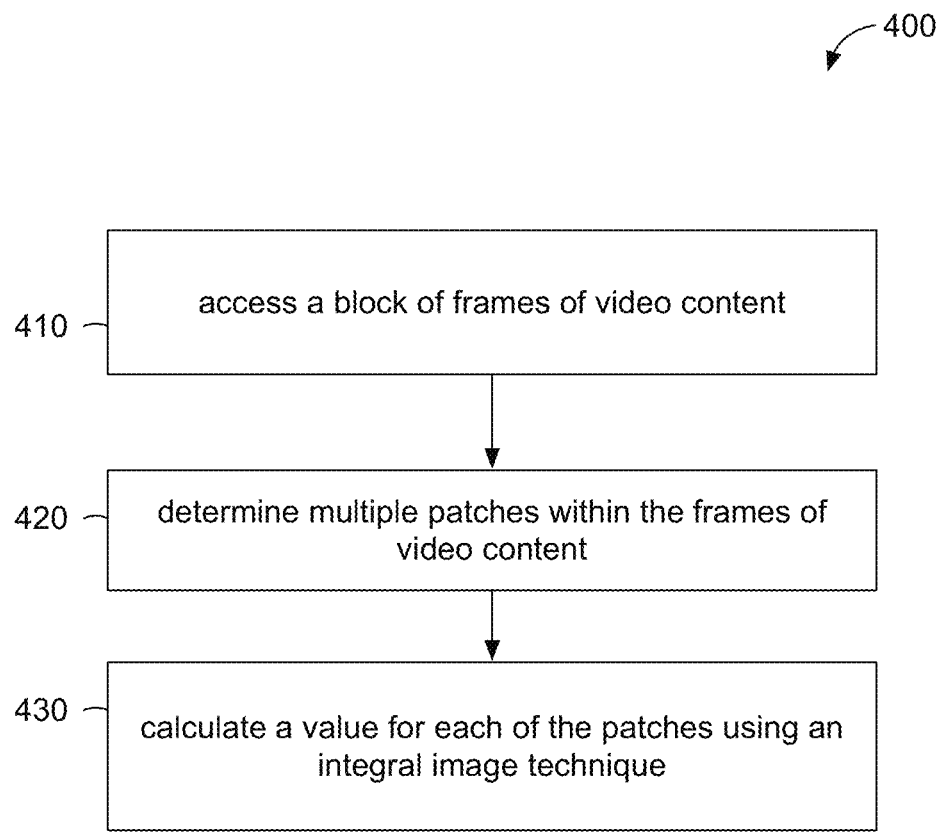
FIG. 4 is a flow diagram illustrating an example method for generating a query fingerprint, according to some example embodiments.

FIG. 4 is a flow diagram illustrating an example method 400 for generating a query fingerprint, according to some example embodiments. The method 400 may be performed by the query fingerprint generator 125 and/or the reference fingerprint generator 115 and, accordingly, is described herein merely by way of reference thereto. It will be appreciated that the method 400 may be performed on any suitable hardware.

In operation 410, the query fingerprint generator 125 accesses a frame or block of frames of video content. For example, the query fingerprint generator 125 may access one or more frames of video content currently playing on the client device 120.

In operation 420, the query fingerprint generator 125, or the reference fingerprint generator 115, selects multiple patches, of one or more frames of video content, that are associated with a displayed region of the video content. For example, the patch selection module 210 selects multiple patches (e.g., 32 patches) of regions of a displayed frame, or patches from multiple frames within a block of frames, among other things.

In operation 430, the query fingerprint generator 125 calculates a value for each of the selected multiple patches using an integral image technique. For example, the value calculation module 220 calculates values for each of the selected regions using the techniques described herein. The calculated values may include values for large regions of a frame, small regions of a frame, regions that overlap (e.g., regions where a smaller patch overlaps a larger patch of a frame), and so on.

Thus, the query fingerprint generator 125 or the reference fingerprint generator 115 may generate a query fingerprint for a single frame and/or a block of frames of video content by selecting patches of regions (e.g. Haar-like features) of the frame or frames, calculating values for each of the selected patches, and performing integral image techniques to generate a query fingerprint using the calculated values for the selected patches, among other things.

Referring back to FIG. 2, the video identification system 150 includes the index module 230, the fingerprint match module 240, and the identification module 250, among other modules, which are configured and/or programmed to match a query fingerprint to a known reference fingerprint.

In some example embodiments, the index module 230 is configured and/or programmed to query a database of known reference fingerprints of video content captured at a reference device, such as the watching station 110. For example, the index module 230 may query an index stored within a database of the watching station 110, an index stored within the video identification system 150, and so on.

For example, the index module 230 may be configured to query an index of quantized patch values of the known reference fingerprints. The index module 230 may query an index of 8-, 16-, and/or 24-bit numbers that are associated with single frames of the reference fingerprints. The index module 230 may derive the numbers by quantizing one or more patch values of the reference fingerprints. For example, the index module 230 may normalize fingerprint values by their absolute sum, by log normalization, and so on.

The index module 230 may index some or all frames of the reference fingerprints using the best or better correlated values of large regions of the frames. The index module 230 may create an index using highly correlated values of the full frame patches, because the features associated with the best correlated values may represent the remaining patches of a frame, among other things.

For example, when three regions of a frame are the best correlated values, the index module 230 quantizes each of the three values to 8-bits, such as by placing them in an evenly spaced histogram with a maximum and minimum limit, creating a 24-bit number. The index module 230 may then utilize a reference fingerprint index of 24-bit numbers to quickly look up and/or identify frames, because there are only 81 permutations per index to parse when attempting to match fingerprints.

In some example embodiments, the fingerprint match module 240 is configured and/or programmed to determine that a query fingerprint matches at least one known reference fingerprint. For example, the fingerprint match module 240 may determine that a query fingerprint matches at least one known reference fingerprint by determining that a similarity between the query fingerprint and at least one of the known reference fingerprints satisfies a predetermined threshold associated with a Tanimoto distance measurement, a Manhattan distance measurement, and/or other distance measurements associated with matching images or other visual-based content.

For example, the fingerprint match module 240 may compare a query fingerprint to one or more reference fingerprints using the Tanimoto or the Manhattan distance measurements, and determine that the fingerprints match when the comparison indicates that the distance measurement satisfies a predetermined threshold (e.g., is within a certain distance threshold). Of course, the fingerprint match module 240 may utilize other matching techniques in order to determine whether a query fingerprint matches a reference fingerprint, such as Euclidean, Cosine, KL-Divergence and/or Itakura distance measurement techniques, among other distance measurement techniques.

In some example embodiments, the video identification system 150 may utilize various different block sizes (e.g., number of frames, or frame rate) of fingerprints when matching a query fingerprint to a reference fingerprint. For example, the reference fingerprint may be set at 5 frames per second (fps), and occupy approximately 560 KB/h of runtime given an 8-bit value (32 bytes/frame) for the fingerprint, and the query fingerprint, which may include offset errors, may be set at 15 fps or higher. In this example, a query of the index may involve querying multiple reference frames (e.g., 3 frames for a reference fingerprint) of the reference fingerprint index.

Thus, in some example embodiments, the video identification system 150 may optimize a match rate for matching a query fingerprint to a reference fingerprint, by modifying the block sizes of the fingerprints. For example, fingerprint match module 240 may match a query fingerprint to one second of reference video content, 0.5 second of reference video content, and so on.

In some example embodiments, the identification module 250 is configured and/or programmed to identify video content captured at a client device 120 based on a determination that a query fingerprint matches at least one reference fingerprints. For example, the identification module 250 may identify the name or title of the video content, a location within the video content currently being presented by the client device 120, a channel or broadcaster providing the video content, and so on.

Figure 5:
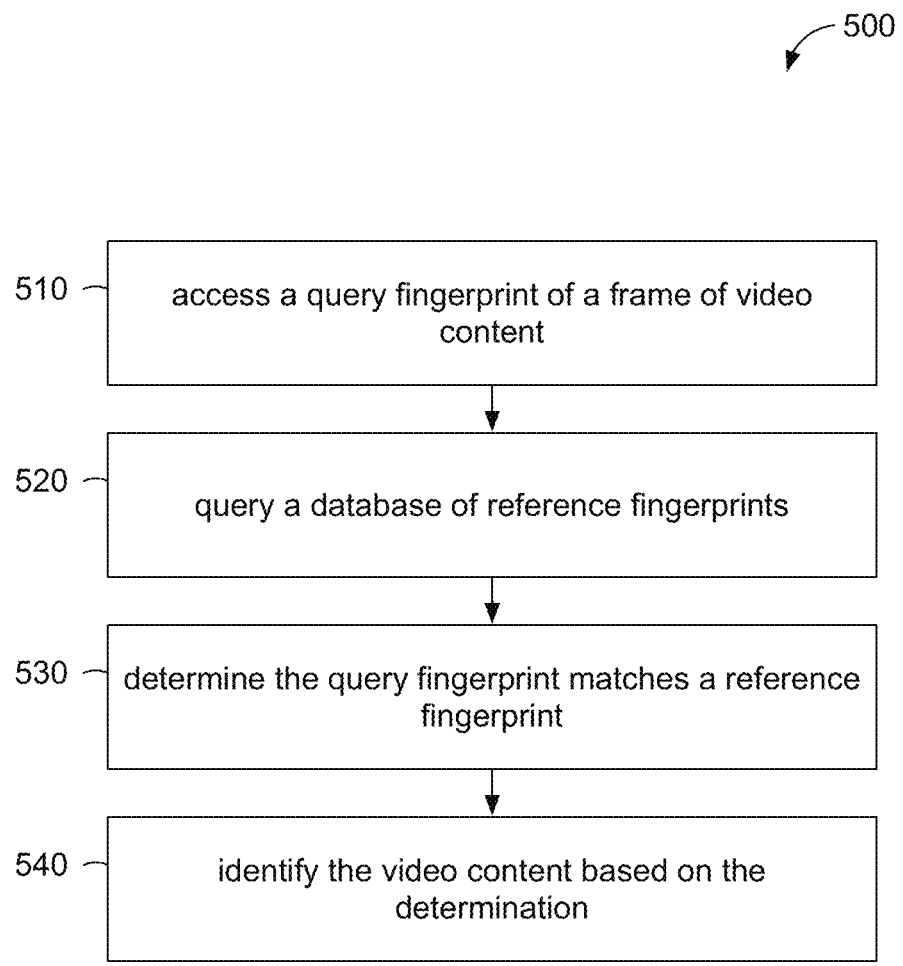
FIG. 5 is a flow diagram illustrating an example method for identifying video content, according to some example embodiments.

FIG. 5 is a flow diagram illustrating an example method 500 for identifying video content, according to some example embodiments. The method 500 may be performed by the video identification system 150 and, accordingly, is described herein merely by way of reference thereto. It will be appreciated that the method 500 may be performed on any suitable hardware.

In operation 510, the video identification system 150 accesses a query fingerprint of video content that is based on multiple patches of a frame or frames of video content captured at a client device. For example, the video identification system 150 may access and/or receive a query fingerprint from the query fingerprint generator 125 of the client device 120.

In operation 520, the video identification system 150 queries a database of reference fingerprints associated with frames of known video content. For example, the index module 230 may query an index of quantized patch values of the known reference fingerprints.

In operation 530, the video identification system 150 determines the query fingerprint matches at least one of the reference fingerprints. For example, the fingerprint match module 240 may determine that a query fingerprint matches at least one known reference fingerprint by determining that a similarity between the query fingerprint and at least one of the query reference fingerprints satisfies a predetermined threshold associated with a Tanimoto distance measurement, a Manhattan distance measurement, and/or other distance measurements associated with matching images or other visual-based content.

In some example embodiments, the video identification system 150 may determine that two or more query fingerprints match two or more reference fingerprints, by using various distance measurement techniques, among other things. For example, the video identification system 150 may identify video content based on a match of multiple fingerprints.

In operation 540, the video identification system 150 identifies the video content captured at the client device based on the determination that the query fingerprint matches at least one of the reference fingerprints. For example, the identification module 250 may identify the name or title of the video content, such as the name of a movie, television program, video clip, video game, and so on.

In some example embodiments, and in response to identifying the video content, the video identification system 150 may return an identifier for supplemental content associated with the identified video content to the client device 120. The client device 120 may use the received identifier to access metadata, event-based content, and/or other supplemental information or content that is associated with the identified video content and/or associated with a time or location (e.g., a frame or block of frames) within the video content, that is currently being presented via the client device.

Figure 6:
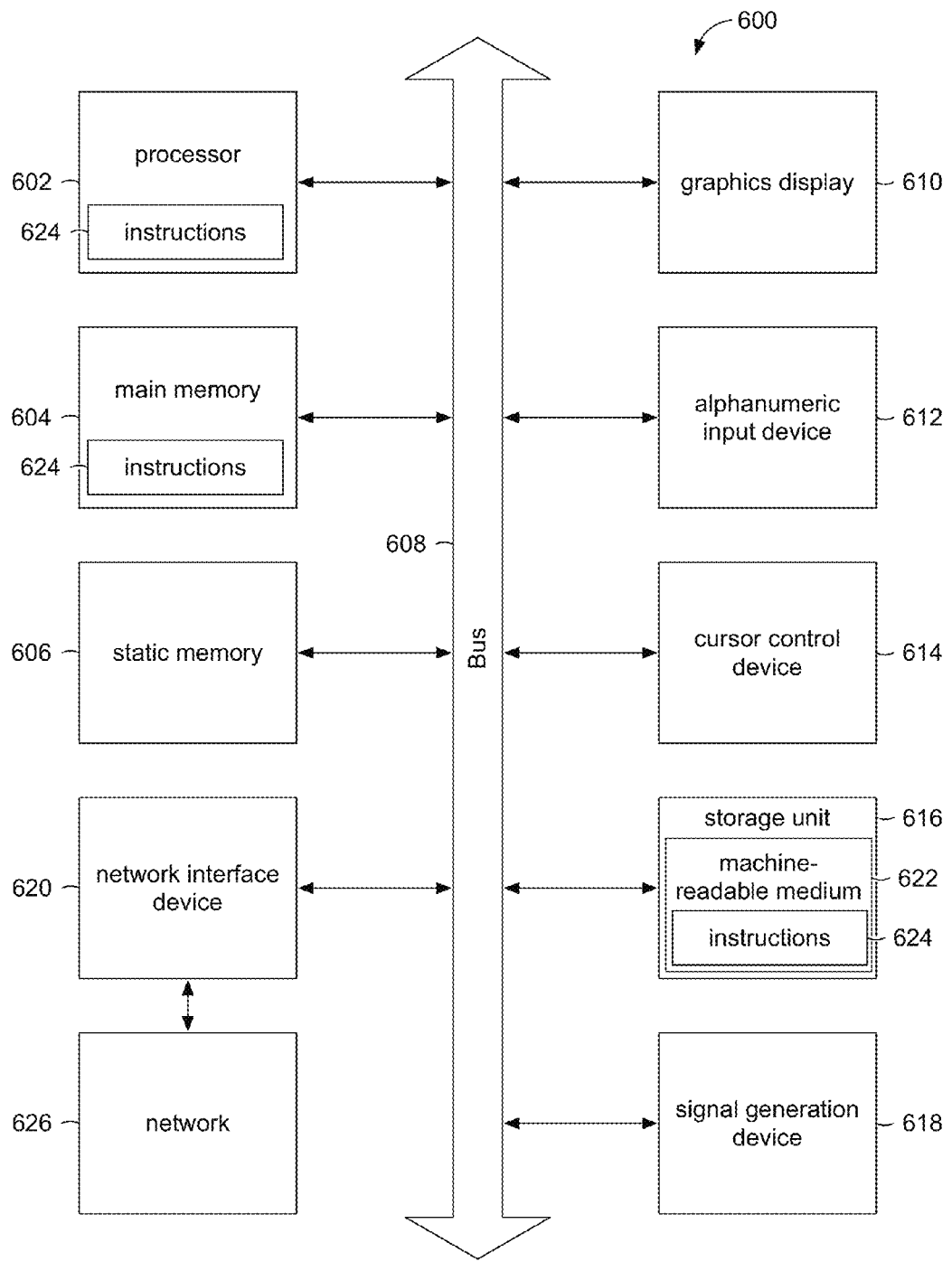
FIG. 6 is a block diagram illustrating components of a machine, according to some example embodiments, able to read instructions from a machine-readable medium and perform any one or more of the methodologies discussed herein.

FIG. 6 is a block diagram illustrating components of a machine 600, according to some example embodiments, able to read instructions from a machine-readable medium (e.g., a machine-readable storage medium) and perform any one or more of the methodologies discussed herein. Specifically, FIG. 6 shows a diagrammatic representation of the machine 600 in the example form of a computer system and within which instructions 624 (e.g., software) for causing the machine 600 to perform any one or more of the methodologies discussed herein may be executed. In alternative embodiments, the machine 600 operates as a standalone device or may be connected (e.g., networked) to other machines. In a networked deployment, the machine 600 may operate in the capacity of a server machine or a client machine in a server-client network environment, or as a peer machine in a peer-to-peer (or distributed) network environment. The machine 600 may be a server computer, a client computer, a personal computer (PC), a tablet computer, a laptop computer, a netbook, an STB, a PDA, a cellular telephone, a smartphone, a web appliance, a network router, a network switch, a network bridge, or any machine capable of executing the instructions 624 (sequentially or otherwise) that specify actions to be taken by that machine. Further, while only a single machine is illustrated, the term "machine" shall also be taken to include a collection of machines that individually or jointly execute the instructions 624 to perform any one or more of the methodologies discussed herein.

The machine 600 includes a processor 602 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 604, and a static memory 606, which are configured to communicate with each other via a bus 608. The machine 600 may further include a graphics display 610 (e.g., a plasma display panel (PDP), an LED display, an LCD, a projector, or a CRT). The machine 600 may also include an alphanumeric input device 612 (e.g., a keyboard), a cursor control device 614 (e.g., a mouse, a touchpad, a trackball, a joystick, a motion sensor, or other pointing instrument), a storage unit 616, a signal generation device 618 (e.g., a speaker), and a network interface device 620.

The storage unit 616 includes a machine-readable medium 622 on which is stored the instructions 624 (e.g., software) embodying any one or more of the methodologies or functions described herein. The instructions 624 may also reside, completely or at least partially, within the main memory 604, within the processor 602 (e.g., within the processor's cache memory), or both, during execution thereof by the machine 600. Accordingly, the main memory 604 and the processor 602 may be considered as machine-readable media. The instructions 624 may be transmitted or received over a network 626 (e.g., network 190) via the network interface device 620.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 622 is shown in an example embodiment to be a single medium, the term "machine-readable medium" should be taken to include a single medium or multiple media (e.g., a centralized or distributed database, or associated caches and servers) able to store instructions (e.g., instructions 624). The term "machine-readable medium" shall also be taken to include any medium that is capable of storing instructions (e.g., software) for execution by the machine (e.g., machine 600), such that the instructions, when executed by one or more processors of the machine (e.g., processor 602), cause the machine to perform any one or more of the methodologies described herein. The term "machine-readable medium" shall accordingly be taken to include, but not be limited to, a data repository in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured by software to become a special-purpose processor, the general-purpose processor may be configured as respectively different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A computer-implemented method, comprising:
   accessing a query fingerprint of a single video frame of video content captured at a client device, the query fingerprint being generated based on a first value of a first spatial region within the single video frame of video content, the first value of the first spatial region being calculated by subtracting a spatial sub-region of the first spatial region from one or more other spatial sub-regions of the first spatial region;
   querying a database of reference fingerprints associated with video frames of known video content, each of the reference fingerprints being generated based on spatial regions within a different single video frame of the known video content;
   determining that the query fingerprint matches at least one of the reference fingerprints; and
   identifying the video content captured at the client device based on the determination that the query fingerprint matches at least one of the reference fingerprints.

2. The computer-implemented method of claim 1, wherein the query fingerprint is generated based on a second value of a second spatial region within the single frame of video content, the second spatial region being distinct from the first spatial region, the second value of the second spatial region being calculated by subtracting a spatial sub-region of the second spatial region from one or more other spatial sub-regions of the second spatial region.

3. The computer-implemented method of claim 2, wherein the query fingerprint is generated based on different weights applied to the first and second values according to different sizes of the first and second spatial regions of the single frame of video content.

4. The computer-implemented method of claim 1, wherein the query fingerprint is generated based on a second value of a second spatial region within the single frame of video content, the second spatial region overlapping the first spatial region, the second value of the second spatial region being calculated by subtracting a spatial sub-region of the second spatial region from one or more other spatial sub-regions of the second spatial region.

5. The computer-implemented method of claim 4, wherein the second spatial region coincides with the first spatial region.

6. The computer-implemented method of claim 4, wherein the spatial sub-regions of the second spatial region are oriented perpendicular to the spatial sub-regions of the first spatial region.

7. The computer-implemented method of claim 1, wherein the subtracting of the spatial sub-region of the first spatial region from the one or more other spatial sub-regions of the first spatial region includes subtracting an inner sub-region of the first spatial region from multiple outer sub-regions of the first spatial region.

8. The computer-implemented method of claim 1, further comprising:
    returning an identifier to the client device for the video content that is associated with metadata to be presented along with the video content via the client device.

9. The computer-implemented method of claim 1, further comprising:
    returning an identifier to the client device for the video content that is associated with event-based information to be presented along with the video content via the client device.

10. The method of claim 1, wherein:
    the subtracting of the spatial sub-region of the first spatial region from the one or more other spatial sub-regions of the first spatial region includes subtracting an inner sub-region of the first spatial region from multiple outer sub-regions of the first spatial region.

11. A system, comprising:
    a query fingerprint generator configured to generate a query fingerprint of a single video frame of video content captured at a client device, the query fingerprint being generated based on our first value of a first spatial region within the single video frame of the video content, the first value of the first spatial region being calculated by subtracting a spatial sub-region of the first spatial region from one or more other spatial sub-regions of the first spatial region;
    an index module that comprises one or more processors and is configured to query a database of reference fingerprints associated with video frames of known video content, each of the reference fingerprints being generated based on spatial regions within a different single video frame of the known video content;
    a fingerprint match module that comprises one or more processors and is configured to determine that the query fingerprint matches at least one of the reference fingerprints; and
    an identification module that comprises one or more processors and is configured to identify the video content captured at the client device based on the determination that the query fingerprint matches at least one of the reference fingerprints.

12. The system of claim 11, wherein the query fingerprint is generated based on a second value of a second spatial region within the single frame of video content, the second spatial region being distinct from the first spatial region, the second value of the second spatial region being calculated by subtracting a spatial sub-region of the second spatial region from one or more other spatial sub-regions of the second spatial region.

13. The system of claim 11, wherein the query fingerprint is generated based on different weights applied to the first and second values according to different sizes of the first and second spatial regions of the single frame of video content.

14. The system of claim 11, wherein the query fingerprint is generated based on a second value of a second spatial region within the single frame of video content, the second spatial region overlapping the first spatial region, the second value of the second spatial region being calculated by subtracting a spatial sub-region of the second spatial region from one or more other spatial sub-regions of the second spatial region.

15. The system of claim 14, wherein the spatial sub-regions of the second spatial region are oriented perpendicular to the spatial sub-regions of the first spatial region.

16. A computer-readable storage medium whose contents, when executed by a computing system, cause the computing system to perform operations, comprising:
    accessing a query fingerprint of a single video frame of video content captured at a client device, the query fingerprint being generated based on a first value of a first spatial region within the single video frame of video content, the first value of the first spatial region being calculated by subtracting a spatial sub-region of the first spatial region from one or more other spatial sub-regions of the first spatial region;
    querying a database of reference fingerprints associated with video frames of known video content, each of the reference fingerprints being generated based on spatial regions within a different single video frame of the known video content;
    determining that the query fingerprint matches at least one of the reference fingerprints; and
    identifying the video content captured at the client device based on the determination that the query fingerprint matches at least one of the reference fingerprints.

17. The computer-readable storage medium of claim 16, wherein the query fingerprint is generated based on a second value of a second spatial region within the single frame of video content, the second spatial region being distinct from the first spatial region, the second value of the second spatial region being calculated by subtracting a spatial sub-region of the second spatial region from one or more other spatial sub-regions of the second spatial region.

18. The computer-readable storage medium of claim 16, wherein the query fingerprint is generated based on a second value of a second spatial region within the single frame of video content, the second spatial region overlapping the firsts spatial region, the second value of the second spatial region being calculated by subtracting a spatial sub-region of the second spatial region from one or more other spatial sub-regions of the second spatial region.

19. The computer-readable storage medium of claim 16, wherein:
    the querying of the database of reference fingerprints associated with video frames of known video content includes querying a database of reference fingerprints with two or more accessed query fingerprints; and
    the determining that the query fingerprint matches at least one of the reference fingerprints includes determining the two or more accessed query fingerprints matches at least two or more reference fingerprints.

20. The computer-readable storage medium of claim 16, wherein:
    the querying of the database of reference fingerprints includes querying an index of quantized region values calculated for the reference fingerprints.

* * * * *